United States Patent [19]

Nakano et al.

[11] 3,915,910

[45] Oct. 28, 1975

[54] INCOMBUSTIBLE POLYOLEFIN COMPOSITION COMPRISING ORGANIC AND INORGANIC FILLER

[75] Inventors: Seikou Nakano; Hiroshi Yui; Saburo Moriwaki; Mitsuo Gochoh; Takeshi Watanabe, all of Yokkaichi, Japan

[73] Assignee: Mitsubishi Petrochemical Co., Ltd., Tokyo, Japan

[22] Filed: Dec. 10, 1974

[21] Appl. No.: 531,352

[30] Foreign Application Priority Data

Dec. 7, 1973   Japan................................ 48-137104

[52] U.S. Cl...................... 260/17.4 CL; 260/17.4 R
[51] Int. Cl.²............................................ C08L 1/00
[58] Field of Search................ 260/17.4 R, 17.4 CL

[56] References Cited
UNITED STATES PATENTS

| | | | |
|---|---|---|---|
| 3,468,839 | 9/1969 | Millane................................ | 260/38 |
| 3,578,629 | 5/1971 | McManimie.......................... | 260/41 |
| 3,741,929 | 6/1973 | Burton.................................. | 260/40 |
| 3,827,933 | 8/1974 | Duggins et al....................... | 161/176 |

OTHER PUBLICATIONS

Chem. Absts., 67:91758a, "Flame–Resistant Coatings," Burns et al.

*Primary Examiner*—Melvin Goldstein
*Assistant Examiner*—Edward Woodberry
*Attorney, Agent, or Firm*—Oblon, Fisher, Spivak, McClelland & Maier

[57]            ABSTRACT

An incombustible polyolefin composition, which comprises 10–65 wt % of a polyolefin, 5–60 wt % of a powdered cellulose filler and 30–85 wt % of an inorganic filler which forms water upon thermal decomposition at temperatures less than the decomposition temperature of the polyolefin.

6 Claims, No Drawings

INCOMBUSTIBLE POLYOLEFIN COMPOSITION COMPRISING ORGANIC AND INORGANIC FILLER

BACKGROUND OF THE INVENTION

1. Field of the Invention

The present invention relates to an incombustible polyolefin composition which does not form a toxic gas or smoke upon combustion.

2. Description of the Prior Art

It is known to form incombustible resin compositions of polyvinylchloride and compositions of a thermoplastic resin and antimony oxide and a halide. These incombustible resin compositions have the disadvantage of generating toxic gases such as hydrogen chloride and antimony chloride from the heat of combustion. It has also been proposed to form incombustible polyolefin compositions by blending a polyolefin and a large amount of an inorganic filler such as aluminum hydroxide. The filler forms water as an incombustible gas upon thermal decomposition at temperatures less than the decomposition temperature of the polyolefin. The filler and the decomposed products are non-toxic, and these polyolefin compositions do not form any toxic gases such as hydrogen chloride when burned and generate only small amounts of black smoke.

Recently, the number of people killed and injured by the toxic gas and smoke generated upon combustion of the conventional incombustible resins has increased significantly which has accelerated an increase in the development of incombustible resin compositions which do not form toxic gases and smoke.

It has been expected that the desired and stable incombustible resin compositions would be prepared by blending a polyolefin and a large amount of an inorganic filler such as aluminum hydroxide which forms water upon thermal decomposition at temperatures lower than the decomposition temperature of the polyolefin. However, inorganic fillers such as aluminum hydroxide tend to thermally decompose gradually to water at temperatures slightly higher than the melting point of the polyolefin. Accordingly, it is necessary to keep the temperatures low such as below 180°C in the molding of the polyolefin compositions containing the inorganic filler, otherwise a satisfactory product cannot be prepared because of the foaming phenomenon caused by the water formed by the initial thermal decomposition of the inorganic filler. Consequently, polypropylene which is blended or molded at relatively high temperatures cannot be used as a base polymer. Even though polyethylene is used as a base polymer, it is necessary to blend the components in a special batch type kneader, and it is difficult to use the composition in injection molding because of the high temperatures to which the composition is subjected. This is a fatal defect, and because of this the application of the composition is quite limited. Consequently, no adequate incombustible polyolefin compositions are known which ca be used in a variety of applications.

A need, therefore, continues to exist for an incombustible polyolefin composition which does not emit toxic gases or smoke when burned and which can be used in a variety of applications.

SUMMARY OF THE INVENTION

Accordingly, one object of the present invention is to provide an incombustible polyolefin composition which does not form toxic gases and smoke when subjected to combustion and does not cause foaming by the water liberated by the initial thermal decomposition of the filler when the composition is molded.

Briefly, this object and other objects of the present invention as hereinafter will become more readily apparent can be attained by an incombustible polyolefin composition which comprises a polyolefin, a powdered cellulose filler and an inorganic filler which forms water upon thermal decomposition at temperatures less than the decomposition temperature of the polyolefin.

DETAILED DESCRIPTION OF THE PREFERRED EMBODIMENTS

The quantities used for the principal components of the incombustible polyolefin compositions are as follows:

| | |
|---|---|
| Powdered cellulose type filler | 5 – 60 wt % |
| Inorganic filler which forms water upon thermal decomposition | 30 – 85 wt % |
| Polyolefin | 10 – 60 wt % |

The inorganic filler which imparts incombustibility to the polyolefin composition in the invention forms water upon thermal decomposition at relatively low temperatures which are below the decomposition temperature of the polyolefin such as less than 350°C. Suitable inorganic fillers include aluminum hydroxide, magnesium carbonate, magnesium hydroxide, and the like. These inorganic fillers thermally decompose as follows.

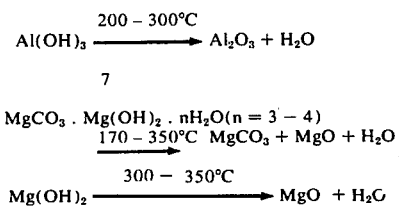

The inorganic fillers which form water upon thermal decomposition can be treated with any desired surface coating of a fatty acid or a surfactant, e.g., a fatty acid salt or a desired surface modification by a reaction of an alcohol or another desired surface treatment. The inorganic fillers can be mixed, and also it is possible to add another inorganic filler such as calcium carbonate, talc, clay, silica, sellaite, asbestos or glass fiber in ratios which maintain the incombustibility of the composition.

It is preferably to use an inorganic filler which has an average particle diameter in the range $0.01 - 50\mu$, preferably $0.1 - 20\mu$. Suitable powdered cellulose fillers used in the invention include powdered wood, chaffs, powdered pulp and mixtures thereof. It is preferable to use the powdered cellulose filler which is crushed to such an extent that it passes through a 5 mesh sieve, preferably a 20 mesh sieve and which contains less than 2% water.

It is preferable to blend the powdered cellulose filler in contact with the inorganic filler in the polyolefin. It is necessary to blend the inorganic filler in amounts greater than 30 wt % to achieve satisfactory incombustibility and less than 85 wt % to achieve satisfactory molding of the composition. The amounts of the inorganic fillers in the compositions are preferably as follows.

|  | The lower limit which imparts self-extinction (ASTM-D.635) | Greatest amount moldable |
| --- | --- | --- |
| Aluminum hydroxide | 45 wt % | 70 wt % |
| Magnesium hydroxide | 40 wt % | 85 wt % |
| Basic magnesium carbonate | 45 wt % | 65 wt % |

The powdered cellulose type filler is blended in amounts of 5–60 wt %, preferably 10–30 wt % based on the composition and in ratios greater than 15 parts by weight, preferably, 20 parts by weight to 100 parts of the inorganic filler to prevent the decomposition by foaming by the synergistic effect with the inorganic filler and to improve the impact strength of the composition.

Suitable polyolefins useful in the invention include homopolymers or copolymers of $\alpha$-olefins such as polypropylene, propylene-ethylene copolymer, high density polyethylene, middle density polyethylene, low density polyethylene; and a modified poly $\alpha$-olefin such as the graft copolymer of an $\alpha$-olefin grafted onto a comonomer having a polar group such maleic acid and blends thereof; and other conventional polyolefin type resins. It is possible to use polyolefins having grafted thereon an $\alpha,\beta$-ethylenically unsaturated carboxylic acid or anhydride such as maleic acid, fumaric acid, itaconic acid, citraconic acid, acrylic acid, methacrylic acid, crotonic acid, isocrotonic acid, mesaconic acid, angelic acid, maleic anhydride, itaconic anhydride, citraconic anhydride, or the like. Suitable grafted polyolefins include a maleic anhydride grafted polypropylene, a maleic anhydride grafted polyethylene, and the like. It is especially preferable to blend more than 10 parts by weight of the modified polyolefin to 100 parts by weight of the unmodified polyolefin, as the mechanical property of the composition is improved. Any desired additive such as an antioxidant, a neutralizer, an ultraviolet absorber, an antistatic agent, a pigment, a dispersing agent, a lubricant, a viscosity improver or the like can be added to the polyolefin composition.

The components of the polyolefin composition can be blended by any of the conventional blending methods such as a roller mill, a Bumbury's mixer, a monoaxial extruder, biaxial extruder or the like. The blended composition can be molded by any of the conventional molding methods such as compression molding, extrusion molding, injection molding, hollow molding, calender molding or the like.

As a consequence of the composition of the present invention the disadvantages of the prior art compositions of foaming of the polyolefin compositions caused by blending of the polyolefin and the inorganic filler, which forms water upon thermal decomposition such as aluminum hydroxide, can be overcome by the synergistic effect of the powdered cellulose type filler and the inorganic filler in the polyolefin. The deterioration of the product caused by foaming can be prevented and the water sustaining property can be improved and the incombustibility improved. In particular, the foaming phenomenon of the prior art compositions in the blending and molding operations at high melting temperatures when polypropylene is used can be prevented. The reason that foaming is inhibited by the combination of the inorganic filler such as aluminum hydroxide and the cellulose type filler such as powdered wood, is not clearly understood from conventional knowledge. However, it is presumed that the foaming inhibition effect results from the combination of a heat absorbing effect and a water absorbing effect of the cellulose type filler for the water formed upon thermal decomposition.

In accordance with the present invention, the polyolefin composition has excellent rigidity, impact strength and size stability by the comprehensive synergistic effect of the specific inorganic filler and the powdered cellulose type filler. Moreover, the polyolefin composition has a high quality, wood-like appearance so that it is suitable for use as incombustible construction materials and for furniture.

Having generally described this invention, a further understanding can be obtained by reference to certain specific examples which are provided herein for purposes of illustration only and are not intended to be limiting unless otherwise specified.

Example 1

The polyolefin compositions containing aluminum hydroxide having an average particle diameter of $3\mu$ (decomposition temperature higher than 200°C) shown in Table 1 were extruded by a monoaxial screw extruder. As shown in Table 2, the compositions composed of the two components of a polyolefin and aluminum hydroxide were obtained as foamed pellets. On the other hand, the compositions composed of a polyolefin, aluminum hydroxide and more than 5 wt % of a cellulose type filler were obtained without foam by pelletization, and the non-foamed pellets could be molded without any difficulties.

TABLE 1

| Composition No. | Polyolefin | wt % | Inorganic filler | wt % | Cellulose type filler | wt.% |
| --- | --- | --- | --- | --- | --- | --- |
| 1 | polypropylene | 50 | aluminum hydroxide | 50 | powdery wood | 0 |
| 2 | " | 47 | " | 50 | " | 3 |
| 3 | " | 45 | " | 50 | " | 5 |
| 4 | " | 40 | " | 50 | " | 10 |
| 5 | high density polyethylene | 50 | " | 50 | " | 0 |
| 6 | " | 47 | " | 50 | " | 3 |
| 7 | " | 45 | " | 50 | " | 5 |
| 8 | " | 40 | " | 50 | " | 10 |
| 9 | propylene-ethylene block copolymer | 50 | " | 50 | " | 0 |
| 10 | " | 47 | " | 50 | " | 3 |
| 11 | " | 45 | " | 50 | " | 5 |
| 12 | " | 40 | " | 50 | " | 10 |
| 13 | polypropylene maleic anhydride grafted polypropylene | 35 / 5 | " | 60 | " | 0 |

TABLE 1 — Continued

| Composition No. | Polyolefin | wt % | Inorganic filler | wt % | Cellulose type filler | wt.% |
|---|---|---|---|---|---|---|
| 14 | polypropylene / maleic anhydride grafted polypropylene | 15 / 5 | " | 60 | " | 20 |
| 15 | polypropylene | 40 | " | 50 | chaffs | 10 |
| 16 | high density polyethylene | 40 | " | 50 | " | 10 |

TABLE 2

| Composition No. | Temperature for pelletization | Result |
|---|---|---|
| 1 | 210 | foam |
| 2 | " | " |
| 3 | " | non-foam |
| 4 | " | " |
| 5 | 180 | difficult pelletization |
| " | 190 | " |
| " | 210 | " |
| 6 | " | " |
| 7 | " | non-foam |
| 8 | " | " |
| 9 | 210 | foam |
| 10 | " | " |
| 11 | " | non-foam |
| 12 | " | " |
| 13 | " | " |
| 14 | " | " |
| 15 | " | " |
| 16 | " | " |

Example 2

The polyolefin compositions containing basic magnesium carbonate having an average particle diameter of 0.5µ (decomposition temperature greater than 175°C) shown in Table 3 were extruded by a biaxial screw extruder. As shown in Table 4, a number of compositions composed of the two components of a polyolefin and basic magnesium carbonate were obtained as foamed pellets. On the other hand, the compositions composed of a polyolefin, basic magnesium carbonate and more than 5 wt % of a cellulose type filler were obtained without foaming in the pelletization process, and the non-foamed pellets could be molded without any difficulties.

TABLE 3

| Composition No. | Polyolefin | wt. % | Inorganic filler | wt. % | Cellulose type filler | wt. % |
|---|---|---|---|---|---|---|
| 17 | polypropylene | 50 | basic magnesium carbonate | 50 | powdery wood | 0 |
| 18 | " | 47 | " | 50 | " | 3 |
| 19 | " | 45 | " | 50 | " | 5 |
| 20 | " | 40 | " | 50 | " | 10 |
| 21 | high density polyethylene | 50 | " | 50 | " | 0 |
| 22 | " | 40 | " | 50 | " | 10 |
| 23 | polypropylene | 40 | " | 50 | chaffs | 10 |
| 24 | high density polyethylene | 40 | " | 50 | " | 10 |

TABLE 4

| Composition No. | Temperature of pelletization | Results |
|---|---|---|
| 17 | 210 | foam |
| 18 | " | " |
| 19 | " | non-foam |
| 20 | " | " |
| 21 | 180 | foam |
| | 190 | " |
| | 210 | " |
| 22 | " | non-foam |
| 23 | " | " |
| 24 | " | " |

Example 3

| | |
|---|---|
| Propylene-ethylene block copolymer (ethylene content 10 wt %) | 25 wt % |
| Maleic acid grafted polypropylene 10 (maleic anhydride content 1.0%) | 5 wt % |
| Aluminum hydroxide (average diameter of 2.5µ) | 50 wt % |
| Powdered wood | 20 wt % |

The components were blended and pelletized by a biaxial screw extruder at 210°C to obtain non-foamed pellets. The pellets were molded in a molding machine whereby a product was obtained which has a high quality, wood-like appearance and excellent rigidity, impact strength, size stability and incombustibility. Further, it did not generate a toxic halide gas. The pellets could be molded by injection molding without foaming.

Example 4

The polyolefin compositions containing magnesium hydroxide having an average particle diameter of 0.05μ (decomposition temperature greater than 300°C) shown in Table 5 were pelletized without foaming by extruding at 230°C in a biaxial screw extruder.

As shown in Table 6, the compositions composed of a polyolefin, magnesium hydroxide and more than 5 wt % of a cellulose type filler had substantially high impact strength resulting from the synergistic effect of the magnesium hydroxide and the cellulose type filler.

TABLE 5

| Composition No. | Polyolefin | wt.% | Inorganic filler | wt.% | Cellulose type filler | wt.% |
|---|---|---|---|---|---|---|
| 25 | polypropylene | 50 | magnesium hydroxide | 50 | powdery wood | 0 |
| 26 |  | 50 | " | 40 | " | 10 |
| 27 |  | 50 | " | 0 | " | 50 |
| 28 | propylene-ethylene block copolymer | 50 | " | 50 | " | 0 |
| 29 |  | 50 | " | 40 | " | 10 |
| 30 |  | 50 | " | 0 | " | 50 |
| 31 |  | 40 | " | 50 | " | 10 |
| 32 | polypropylene<br>maleic anhydride grafted polypropylene | 25<br>5 | " | 70 | " | 0 |
| 33 | polypropylene<br>maleic anhydride grafted polypropylene | 25<br>5 | " | 50 | " | 20 |
| 34 | polypropylene<br>maleic anhydride grafted polypropylene | 25<br>5 | " | 0 | " | 70 |

TABLE 6

| Composition No. | Impact strength (Charpy) (kg-cm/cm²) |
|---|---|
| 25 | 1.8 |
| 26 | 3.8 |
| 27 | 1.6 |
| 28 | 2.8 |
| 29 | 5.9 |
| 30 | 2.6 |
| 31 | 4.5 |
| 32 | 1.4 |
| 33 | 3.5 |
| 34 | 1.3 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. An incombustible polyolefin composition, which comprises: 10–65 wt % of a polyolefin, 5–60 wt % of a powdered cellulose filler and 30–85 wt % of an inorganic filler which forms water upon thermal decomposition at temperatures less than the decomposition temperature of said polyolefin.

2. The incombustible polyolefin composition of claim 1, wherein said inorganic filler is aluminum hydroxide, magnesium hydroxide or basic magnesium carbonate.

3. The incombustible polyolefin composition of claim 1, wherein said powdered cellulose filler is powdered wood, chaffs or powdered pulp.

4. The incombustible polyolefin composition of claim 1, wherein said polyolefin is polypropylene, propylene-ethylene copolymer, high density polyethylene, middle or low density polyethylene, grafted polypropylene or grafted polyethylene.

5. The incombustible polyolefin composition of claim 1, wherein said polyolefin is a combination of a homopolymer of ethylene or propylene and a grafted polyolefin.

6. The incombustible polyolefin composition of claim 1, wherein said cellulose filler is powdered wood filler and said inorganic filler is aluminum hydroxide.

* * * * *